United States Patent
Hsiao et al.

(10) Patent No.: US 10,286,378 B2
(45) Date of Patent: May 14, 2019

(54) METHOD FOR PREPARATION OF GOLD NANOPARTICLES THROUGH PULSED LASER

(71) Applicant: National Chi Nan University, Nantou County (TW)

(72) Inventors: Kuei-Sen Hsiao, Nantou County (TW); Chih-Chien Chu, Taichung (TW)

(73) Assignee: NATIONAL CHI NAN UNIVERSITY, Nantou County (TW)

( * ) Notice: Subject to any disclaimer, the term of this patent is extended or adjusted under 35 U.S.C. 154(b) by 231 days.

(21) Appl. No.: 15/358,990

(22) Filed: Nov. 22, 2016

(65) Prior Publication Data

US 2018/0099260 A1    Apr. 12, 2018

(30) Foreign Application Priority Data

Oct. 11, 2016   (TW) .............................. 105132692 A

(51) Int. Cl.
    *B01J 19/00*  (2006.01)
    *B01J 19/06*  (2006.01)
    (Continued)

(52) U.S. Cl.
    CPC ......... *B01J 19/121* (2013.01); *B01J 19/0053* (2013.01); *B01J 19/06* (2013.01);
    (Continued)

(58) Field of Classification Search
    CPC ...... B01J 19/121; B01J 19/06; B01J 2219/12; B01J 2219/0877; B01J 19/0053; B82Y 30/00
    See application file for complete search history.

(56) References Cited

U.S. PATENT DOCUMENTS 8,858,676 B2    10/2014    Liu et al.

OTHER PUBLICATIONS

El Hamzaoui et al, Room temperature direct space-selective growth of gold nanoparticles inside a silica matrix based on a femtosecond laser irradiation, Materials Letters 64 (2010) pp. 1279-1282 (Year: 2010).*

(Continued)

*Primary Examiner* — James Lin
*Assistant Examiner* — Colleen M Raphael
(74) *Attorney, Agent, or Firm* — Muncy, Geissler, Olds & Lowe, P.C.

(57) ABSTRACT

A method for preparation of gold nanoparticles in aqueous solution through pulsed laser, comprises firstly preparing an aqueous solution including $HAuCl_4 \cdot H_2O$ and $H_2O_2$, followed by allowing a catalytic light source to emit into the aqueous solution for catalysis, such that a plurality of gold nanoparticles are formed in the aqueous solution, the catalytic light source being a pulsed laser. Additionally, it is also possible for firstly placing a porous silicon substrate into the aqueous solution, and then allowing the catalytic light source to emit into the aqueous solution for catalysis, such that the gold nanoparticles are grown on the surface of the porous silicon substrate. In this way, the gold nanoparticles of smaller particle diameters with more uniform size may be obtained without adding a surfactant during the preparation.

6 Claims, 3 Drawing Sheets
(1 of 3 Drawing Sheet(s) Filed in Color)

(51) Int. Cl.
    *B01J 19/12*    (2006.01)
    *B82Y 30/00*    (2011.01)
(52) U.S. Cl.
    CPC ....... *B82Y 30/00* (2013.01); *B01J 2219/0877* (2013.01); *B01J 2219/12* (2013.01)

(56) References Cited

OTHER PUBLICATIONS

Patel et al, "Synthesis of surfactant-free electrostatically stabilized gold nanoparticles by plasma-induced liquid chemistry," 2013 Nanotechnology vol. 24 245604 (Year: 2013).*
Mafune' et al, "Formation of Gold Nanoparticles by Laser Ablation in Aqueous Solution of Surfactant," J. Phys. Chem. B 2001 vol. 105, pp. 5114-5120 (Year: 2001).*
Zhao et al, "Photoinduced formation of colloidal Au by a near-infrared femtosecond laser," J. Mater. Res. vol. 18, No. 7, Jul. 2003 (Year: 2003).*
Chen et al, Rapid Fabrication of Gold Nanoflowers Tuned by pH: Insights Into the Growth Mechanism, J. Nanosci. Nanotechnol. 2015, vol. 15, No. 4 (Year: 2015).*
Ferreira et al, "Enhancement of laser induced Au nanoparticle formation by femtosecond pulse shaping," Laser Phys. 23 (2013) 076004 (Year: 2013).*
Karlicek et al, "Laser-induced metal deposition on InP," Journal of Applied Physics 53, 1084 (1982) (Year: 1982).*
Keunen et al, "Stable ligand-free stellated polyhedral gold nanoparticles for sensitive plasmonic detection," Nanoscale, 2016, 8, 2575 (Year: 2016).*
Kurihara et al, "Laser and Pulse Radiolytically Induced Colloidal Gold Formation in Water and in Water-in-Oil Microemulsions," J. Am. Chem. Soc., vol. 105, No. 9, 1983, p. 2574 (Year: 1983).*
Liu et al, "Rapid Seeded Growth of Monodisperse, Quasi-Spherical, Citrate-Stabilized Gold Nanoparticles via $H_2O_2$ Reduction," Langmuir 2012, 28, 13720-13726 (Year: 2012).*
Panda et al, "Synthesis of Au Nanoparticles at "all" pH by $H_2O_2$ Reduction of $HAuCl_4$," Journal of Nanosciencean and Nanotechnology, vol. 7, 1911-1915, 2007 (Year: 2007).*
Samna et al, "Synthesis of Au nanoparticle-conductive polyaniline composite using $H_2O_2$ as oxidising as well as reducing agent," Chem. Commun. , 2002, 1048-1049 (Year: 2002).*
Sarma et al, "Starch-Mediated Shape-Selective Synthesis of Au Nanoparticles with Tunable Longitudinal Plasmon Resonance," Langmuir 2004, 20, 3520-3524 (Year: 2004).*
Spano et al, "In Situ Formation and Size Control of Gold Nanoparticles into Chitosan for Nanocomposite Surfaces with Tailored Wettability," Langmuir 2012, 28, 3911-3917 (Year: 2012).*
Wu et al, "A plasmon resonance light scattering assay of glucose based on the formation of gold nanoparticles," Anal. Methods, 2014, 6, 3779 (Year: 2014).*
Zhao et al, "Deposition of $Au/TiO_2$ film by pulsed laser," Applied Surface Science 252 (2006) 7415-7421 (Year: 2006).*

* cited by examiner

METHOD FOR PREPARATION OF GOLD NANOPARTICLES THROUGH PULSED LASER

FIELD OF THE INVENTION

The present invention is related to a method for preparation of gold nanoparticles, particularly to a method for preparation of gold nanoparticles through pulsed laser without adding a surfactant during the preparation.

BACKGROUND OF THE INVENTION

Gold nanoparticles, also called nanogold or colloidal gold, may be readily accumulated to be a gold clump in air, so as generally to be prepared in a solution. The gold nanoparticles smaller than 100 nm in size are usually allowed to turn the solution intense red, while the gold nanoparticles larger than 100 nm in size are then allowed to turn the solution blue or violet. Moreover, the gold nanoparticles are widely researched due to their specific optics features, electronic features, molecular recognition features and good biocompatibility thereof, and are at present applied to the fields of electron microscope, electronics, materials science, nano science and technology, biochemical sensing, optical detection, drug delivery, catalyzed reaction, disease treatment, electronic engineering, template induced crystallization and etc.

Further, the way for the production of gold nanoparticles is disclosed as U.S. Pat. No. 8,858,676, entitled "Nanoparticle production in liquid with multiple-pulse ultrafast laser ablation", comprising a pulsed laser, a vibration mirror and a gold clump in a solution, the pulsed laser emitting a pulsed beam toward the vibration mirror, and the pulsed beam being reflected by the vibration mirror to the gold clump, so as to ablate the gold clump into nanoparticles having the average diameter of less than 100 nm.

However, it is less simple for laser ablation to control the shape and size of the gold nanoparticles, with the gold nanoparticles having larger particle diameters formed thereby. Therefore, how to reduce the particle diameters and uniforming the size of the gold nanoparticles is truly an important issue.

SUMMARY OF THE INVENTION

It is the main object of the present invention to solve the problem of larger particle diameters and non-uniform size of the gold nanoparticles.

For achieving the above object, the present invention provides a method for preparation of gold nanoparticles in aqueous solution through pulsed laser, comprising the steps of:

preparing an aqueous solution including $HAuCl_4 \cdot 3H_2O$ and $H_2O_2$, followed by allowing a catalytic light source to emit into the aqueous solution for catalysis, such that a plurality of gold nanoparticles are formed in the aqueous solution, the catalytic light source being a pulsed laser.

For achieving the above object, the present invention further provides a method for growing gold nanoparticles on porous silicon substrate in aqueous solution through pulsed laser, comprising the steps of:

preparing an aqueous solution including $HAuCl_4 \cdot 3H_2O$ and $H_2O_2$, follow by placing a porous silicon substrate into the aqueous solution and finally allowing a catalytic light source to emit into the aqueous solution for catalysis, such that a plurality of gold nanoparticles are grown on the surface of the porous silicon substrate, the catalytic light source being a pulsed laser.

To sum up, it's unnecessary to add a surfactant during the preparation in the present invention, and $H_2O_2$ used in the present invention is a weak oxidizing agent to be used in conjunction with the pulsed laser for catalysis, in such a way that the gold nanoparticles of smaller particle diameters and more uniform size are generated in the aqueous solution or on the surface of the porous silicon substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The detailed description and technical solution with respect to the present invention will be now described in conjunction with the drawings as follows.

Figure 1:
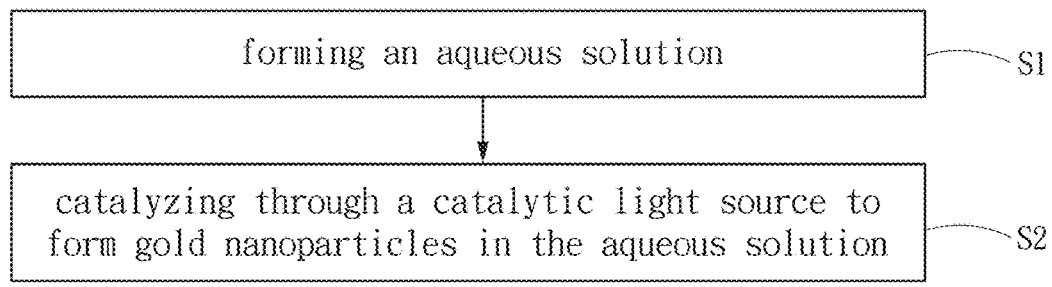
FIG. 1 is a flow chart of a first embodiment of the present invention.

Referring to FIG. 1, there is shown a method for preparation of gold nanoparticles in aqueous solution through pulsed laser, comprising the steps of:

Step S1: preparing an aqueous solution including chloroauric acid aqueous solution ($HAuCl_4 \cdot 3H_2O$) and hydrogen peroxide ($H_2O_2$), in which the concentration of $HAuCl_4 \cdot 3H_2O$ in the aqueous solution is in the range from 0.25 mM to 0.33 mM, preferably 0.33 mM, and Step S2: allowing a catalytic light source to emit into the aqueous solution for catalysis, such that a plurality of gold nanoparticles are formed in the aqueous solution, the catalytic light source being a pulsed laser (Nd:YAG). The wavelength of the pulsed laser is in the range from 480 nm to 585 nm, with the strength thereof being 0.31 W to 3.9 W, in which the wavelength of the pulsed laser is 532 nm, the strength thereof is 0.35 W, and duration time of irradiation of the aqueous solution is in the range from 2.5 mins to 7.5 mins in this embodiment.

Figure 2:
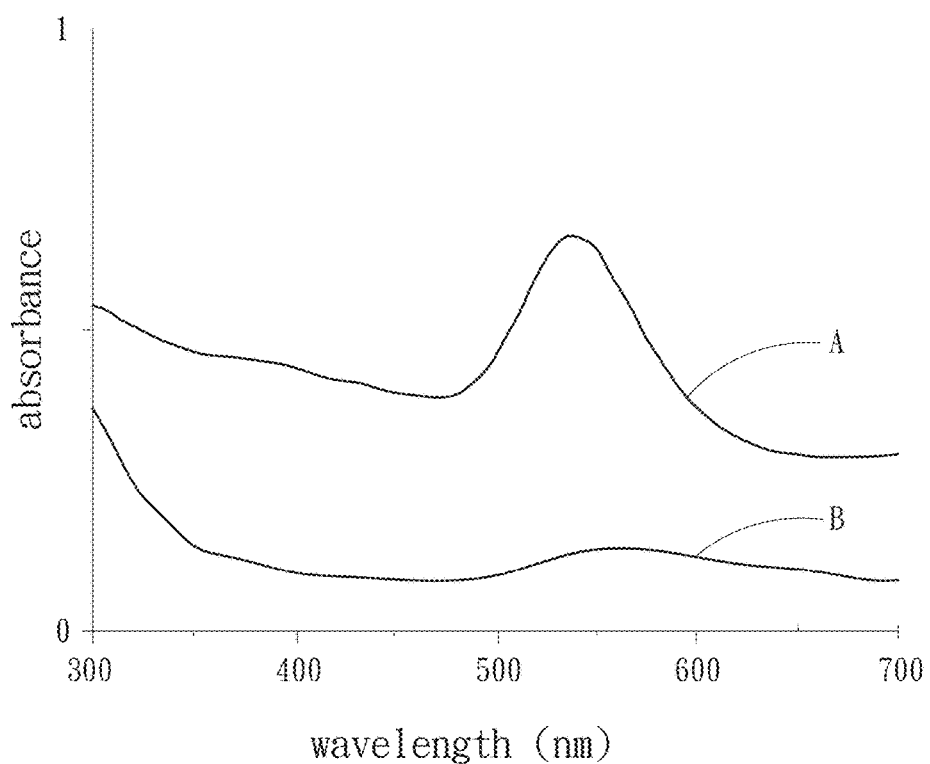
FIG. 2 is an absorption spectrum graph of the first embodiment of the present invention.
Figure 3:
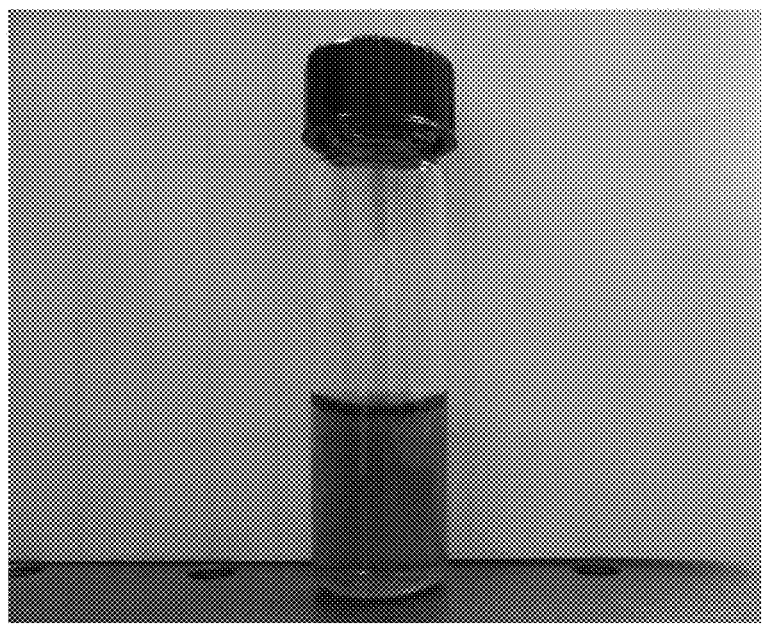
FIG. 3 is an actual photo of the first embodiment of the present invention.
Figure 4:
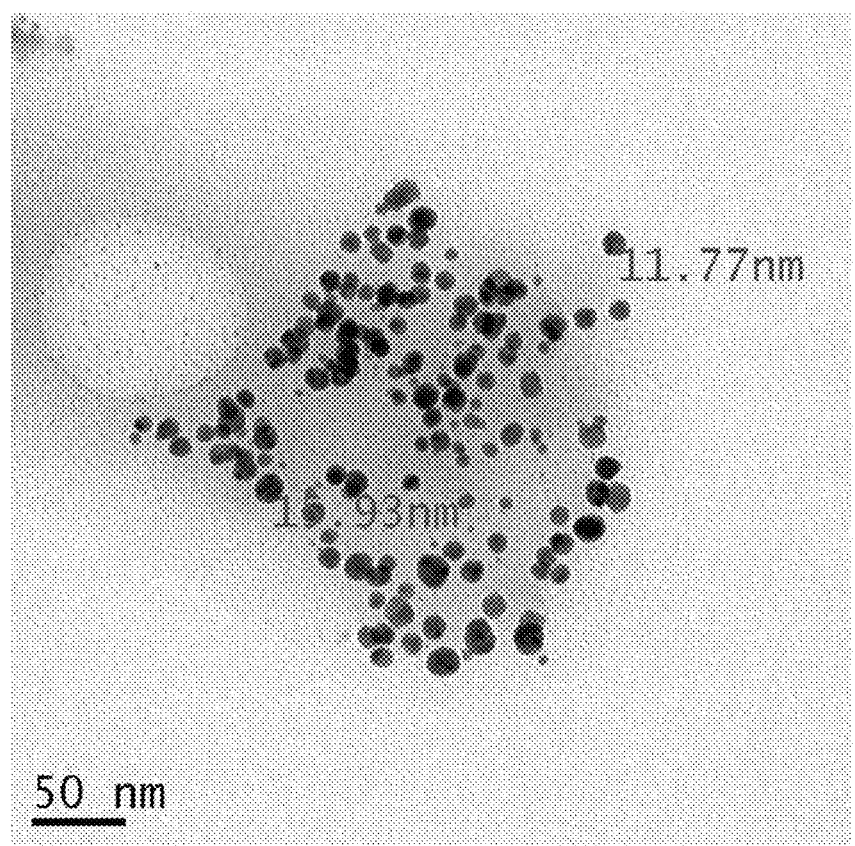
FIG. 4 is an illustration showing experimental data of the first embodiment of the present invention.

Subsequently, referring to FIG. 2 together, there is shown an absorption spectrum of this embodiment, with the concentration of $HAuCl_4 \cdot 3H_2O$ in the aqueous solution being 0.33 mM. When the pulsed laser is not used for irradiating the aqueous solution yet, the absorption spectrum of the aqueous solution is illustrated as a line segment B. Afterwards, after the pulsed laser is used for irradiation for five 5 mins, the absorption spectrum of the aqueous solution is then illustrated as a line segment A. It is known from obvious wave crest around 530 nm that the gold nanoparticles are generated in the aqueous solution, in which the center wavelength of the absorption spectrum is located at 550 nm. Moreover, the generation of gold nanoparticles is also confirmed through color change of the aqueous solution. As illustrated in FIG. 3, the aqueous solution has turned pink due to localized surface plasma resonance (abbreviated as LSPR) between the gold nanoparticles. Moreover, as shown in a transmission electron microscopy (TEM) image illustrated in FIG. 4, the particle size of the gold nanoparticles is in the range from 2 nm to 16 nm. Further, 11.77 nm and 15.93 nm in this figure indicate the individual particle size of the labelled gold nanoparticles, respectively. FIGS. 3 and 4 in this disclosure are shown in colors for representing the color and indication of particle diameters clearly.

Figure 5:
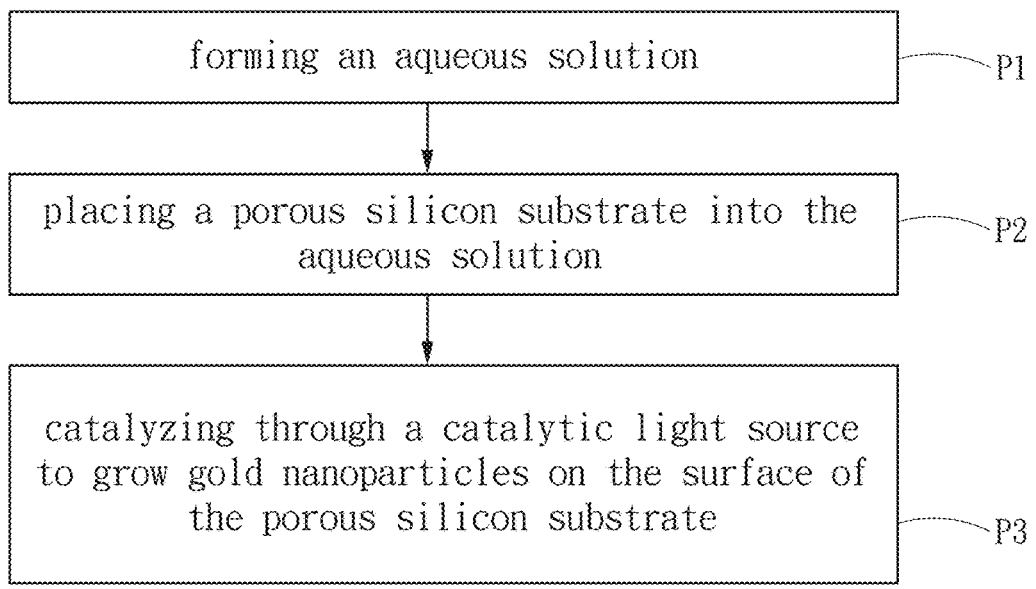
FIG. 5 is a flow chart of a second embodiment of the present invention.

Subsequently, referring to FIG. 5 together, there is shown a method for growing gold nanoparticles on porous silicon substrate in aqueous solution through pulsed laser, comprising the steps of.

Step P1: preparing an aqueous solution including $HAuCl_4 \cdot 3H_2O$ and $H_2O_2$, in which the concentration of $HAuCl_4 \cdot 3H_2O$ in the aqueous solution is in the range from 0.25 mM to 0.33 mM, preferably 0.33 mM, Step P2: placing a porous silicon substrate into the aqueous solution, the porous silicon substrate being made by hydrofluoric acid corrosion, electrochemical corrosion or the like, and Step P3: allowing a catalytic light source to emit into the aqueous solution for catalysis, such that a plurality of gold nanoparticles are grown on the surface of the porous silicon substrate, the catalytic light source being a pulsed laser. The wavelength of the pulsed laser is in the range from 480 nm to 585 nm, with the strength thereof being 0.31 W to 3.9 W, in which the wavelength of the pulsed laser is 532 nm, the strength thereof is 0.35 W, and duration time of irradiation of the aqueous solution is in the range from 2.5 mins to 7.5 mins in this embodiment.

Figure 6:
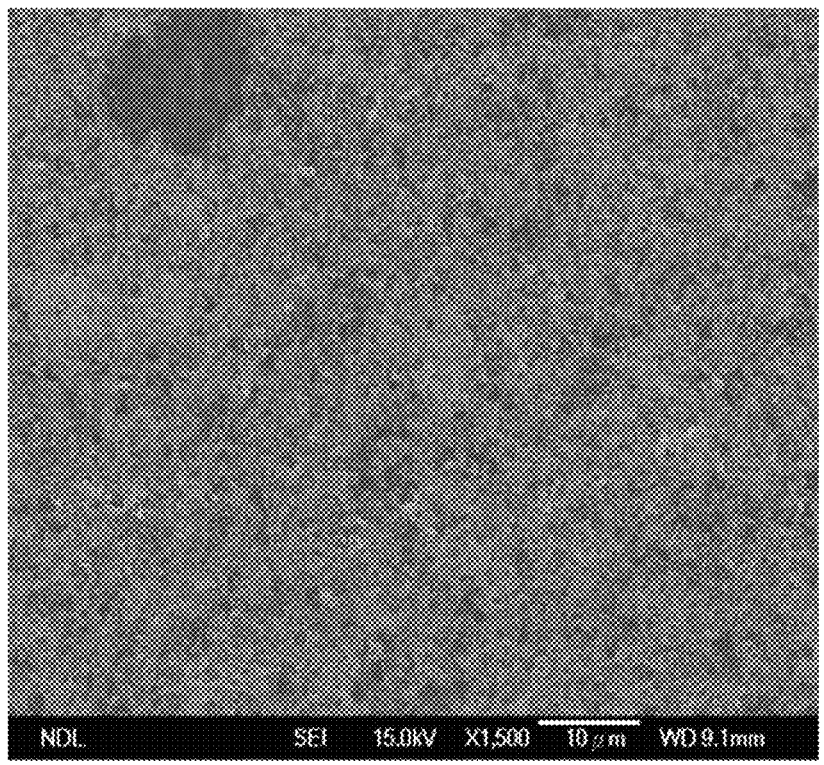
FIG. 6 is a diagram showing experimental data of the second embodiment of the present invention.

Subsequently, referring to FIG. 6 together, there is shown a scanning electron microscopy (SEM) image of the gold nanoparticles formed on the surface of the porous silicon substrate. In this case, the concentration of the $HAuCl_4 \cdot 3H_2O$ in the aqueous solution is 0.33 mM, while the particle size of the gold nanoparticles is in the range from 2 nm to 16 nm.

To sum up, it's unnecessary to add a surfactant during the preparation in the present invention, and $H_2O_2$ used in the present invention is a weak oxidizing agent to be used in conjunction with the pulsed laser for catalysis, in such a way that the gold nanoparticles are generated in the aqueous solution or on the surface of the porous silicon substrate, while these gold nanoparticles are of smaller particle diameters and more uniform size.

What is claimed is:

1. A method for preparation of gold nanoparticles in aqueous solution through pulsed laser, comprising the steps of: preparing an aqueous solution including chloroauric acid aqueous solution and $H_2O_2$; and allowing a catalytic light source to emit into said aqueous solution for catalysis, such that a plurality of gold nanoparticles are formed uniformly in a range from 2 nm to 16 nm in said aqueous solution, said catalytic light source being a pulsed laser; wherein time for said catalytic light source to emit is in a range from 2.5 mins to 7.5 mins, and the wavelength of said pulsed laser is in a range from 480 nm to 585 nm, with the strength thereof being 0.31 W to 3.9 W.

2. The method for preparation of gold nanoparticles in aqueous solution through pulsed laser according to claim 1, wherein the concentration of chloroauric acid aqueous solution in said aqueous solution is in a range from 0.25 mM to 0.33 mM.

3. The method for preparation of gold nanoparticles in aqueous solution through pulsed laser according to claim 1, wherein the wavelength of said pulsed laser is 532 nm, with the strength thereof being 0.35 W.

4. A method for growing gold nanoparticles on porous silicon substrate in aqueous solution through pulsed laser, comprising the steps of: preparing an aqueous solution chloroauric acid aqueous solution and $H_2O_2$; placing a porous silicon substrate into said aqueous solution; and allowing a catalytic light source to emit into said aqueous solution for catalysis, such that a plurality of gold nanoparticles are grown uniformly in a range from 2 nm to 16 nm on the surface of said porous silicon substrate, said catalytic light source being a pulsed laser; wherein time for said catalytic light source to emit is in a range from 2.5 mins to 7.5 mins, and the wavelength of said pulsed laser is in a range from 480 nm to 585 nm, with the strength thereof being 0.31 W to 3.9 W.

5. The method for growing gold nanoparticles on porous silicon substrate in aqueous solution through pulsed laser according to claim 4, wherein the concentration of chloroauric acid aqueous solution in said aqueous solution is in a range from 0.25 mM to 0.33 mM.

6. The method for growing gold nanoparticles on porous silicon substrate in aqueous solution through pulsed laser according to claim 4, wherein the wavelength of said pulsed laser is 532 nm, with the strength thereof being 0.35 W.

* * * * *